May 10, 1966  E. H. KENNEDY  3,250,598
FURNACE FOR PRODUCING CHAR FROM BLACK LIQUOR
Filed Aug. 2, 1962  2 Sheets-Sheet 1

INVENTOR,
EUGENE H. KENNEDY
BY
ATTORNEY

May 10, 1966  E. H. KENNEDY  3,250,598
FURNACE FOR PRODUCING CHAR FROM BLACK LIQUOR
Filed Aug. 2, 1962  2 Sheets-Sheet 2
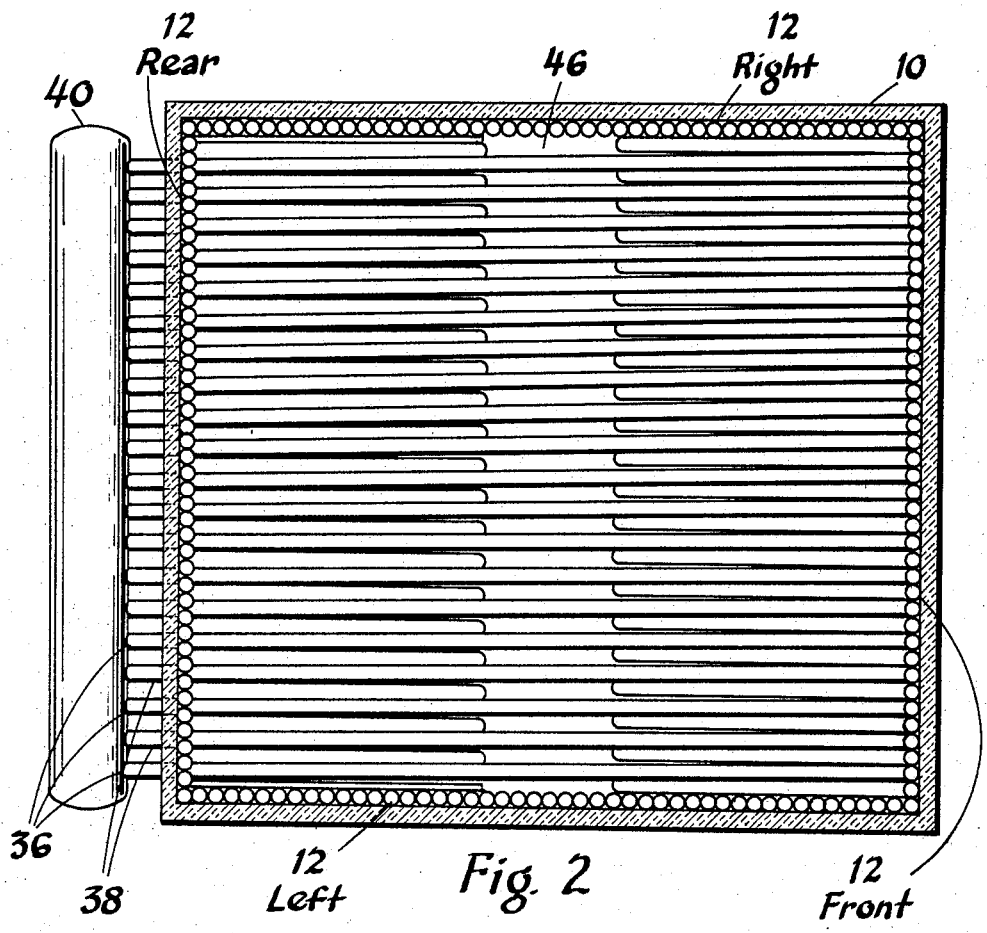
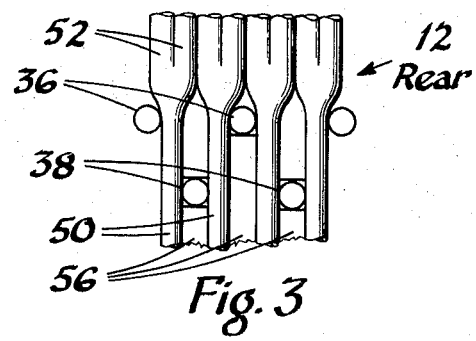
INVENTOR,
EUGENE H. KENNEDY
BY
R. F. Bryant
ATTORNEY """
United States Patent Office 3,250,598
Patented May 10, 1966

3,250,598
FURNACE FOR PRODUCING CHAR FROM BLACK LIQUOR
Eugene H. Kennedy, West Hartford, Conn., assignor to Combustion Engineering, Inc., Windsor, Conn., a corporation of Delaware
Filed Aug. 2, 1962, Ser. No. 214,362
2 Claims. (Cl. 23—277)

This invention relates to a chemical recovery furnace, and in particular to a chemical recovery furnace and method of operation thereof for producing char from black liquor.

The preparation of pulp from wood results in producing a large quantity of liquor containing carbon and inorganic chemicals. These chemicals are valuable and thus it is desirable to further process this liquor in order to recover the chemicals therefrom.

The most widely used method at present for recovering these inorganic chemicals is to pass the liquor through multiple effect evaporators, or multiple effect evaporators in series with gas or air contact evaporators, where it is concentrated, resulting in what is known as "black liquor" which contains 25–50% moisture or water. This black liquor is then introduced into a chemical recovery furnace where the carbon within the black liquor is completely burned, and the inorganic chemicals are tapped off from the bottom of the furnace in molten or liquid form, called "smelt." The majority of the combustion takes place in the bottom of the furnace, where the black liquor lies in a huge burning pile. Air is directed into the burning pile to insure that complete combustion of the carbon takes place. The heat resulting from the burning is used to produce steam in a waste heat boiler downstream of the furnace.

In contrast to the above, in accordance with applicant's invention, a chemical recovery furnace is provided in which the carbon within the black liquor is only partially burned, resulting in the discharge from the furnace bottom of black ash or char, containing carbon and inorganic chemicals, such as sodium carbonate and sodium sulphide. The inorganic chemicals can be leached out of the black ash or char. The remaining carbon can then be further processed in order to obtain activated carbon, which is a highly absorbent material useful as filters.

It is the object of this invention to provide a chemical recovery furnace, and method of operation thereof, for producing char from black liquor, whereby only a portion of the carbon contained in the black liquor is burned.

How the foregoing is accomplished will be more readily understood from the specification hereinafter following by reference to the accompanying drawings wherein:

FIG. 2 is a horizontal cross section of the chemical recovery furnace, taken on line 2—2 of FIG. 1; and FIG. 3 is a view showing the construction of the furnace wall where the screen tubes pass therethrough, taken on line 3—3 of FIG. 1.

Figure 1:
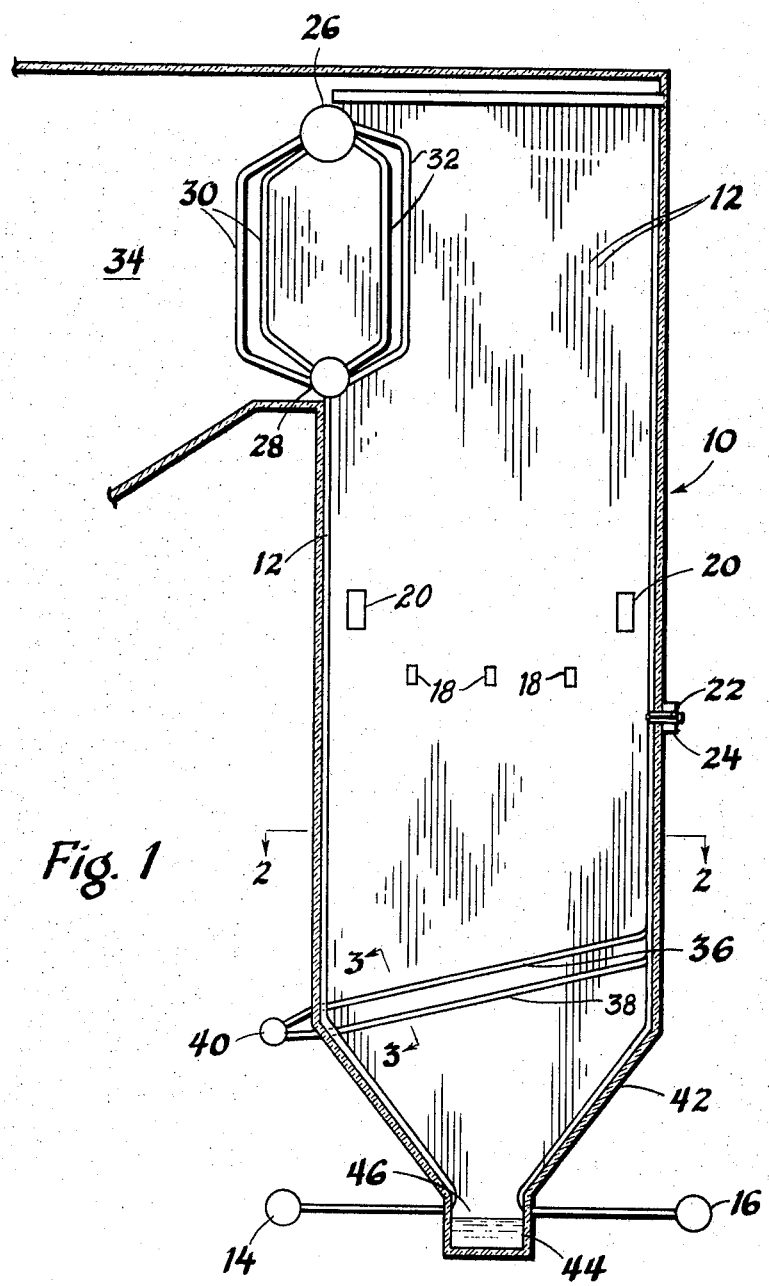
FIG. 1 is a schematic section of a chemical recovery furnace constructed in accordance with my invention.

Looking now to FIG. 1, numeral 10 denotes a chemical recovery furnace, the four walls of which are lined with tubes 12. Supply headers 14 and 16 furnish water to the tubes 12, with the water flowing through such tubes absorbing heat from the hot combustion gases within the furnace.

Black liquor, which has previously been concentrated in multiple effect evaporators, or multiple effect evaporators in series with gas or air contact evaporators (not shown), is fed into the furnace through inlets 18. This black liquor contains 25–50% moisture, along with carbon, and inorganic chemicals such as sodium hydroxide, sodium sulphide, sodium sulphate and sodium carbonate. Preferably, the black liquor is concentrated sufficiently in the above mentioned evaporators so that it contains 65% or more solids before being introduced into the furnace. Air to support combustion of the carbon contained within the black liquor enters the furnace by way of air supply inlets 20. The amount of air supplied through these inlets 20 is insufficient to support combustion of, or burn out, all of the carbon contained in the black liquor.

An auxiliary fuel inlet 22 supplies a high B.t.u. content fuel, such as oil or natural gas, to the furnace interior. Air to support combustion of this auxiliary fuel is supplied through inlet 24. The purpose of this auxiliary fuel is to maintain ignition of the black liquor, insure a stable burning of such black liquor at all times, and promote drying. It has been found that about 10 percent of the total heat input to the furnace should be supplied by the auxiliary fuel.

The hot combustion gases rise upwardly in the furnace passing outwardly therefrom into gas pass 34. Within the horizontal portion of the gas pass is located a drum arrangement consisting of steam and water drum 26, and lower drum 28. These drums are connected by downcomers 30 and risers 32. Water flows downwardly from drum 26 through downcomers 30, and a mixture of steam and water flows upwardly through risers 32. The steam then flows from drum 26 either to a point of use or into superheater sections (not shown) for further heating before passing on to its ultimate point of use.

Located in the lower portion of the furnace at approximately the height where the hopper bottomed walls 42 begin is a screen made up of water cooled tubes 36 and 38. As best seen in FIG. 2, these rows of tubes 36 and 38 do not lie directly beneath each other but are staggered. Header 40 supplies water to the screen tubes 36 and 38. After passing through the furnace interior, tubes 36 and 38 bend upwardly into the plane of the tubes lining the front wall (right hand wall as shown in FIG. 1) of the furnace. In order to permit this arrangement, the tubes 42 lining the front furnace bottom wall as illustrated in FIG. 1 should be finned, up to the point where tubes 36 and 38 enter the tube wall panel, 12 Front.

In order to conveniently allow the passage of tubes 36 and 38 through the rear furnace bottom wall as shown in FIG. 1, bifurcated tubes are used on such rear wall, 12 Rear. As best shown in FIG. 3, each single tube portion 50 branches off into two tube portions 52. The screen tubes 36 and 38 pass by the wall tubes 12 through the spaces or gaps between the tube portions 50. The spaces between the tube portions 50 are filled by fins 56 which are welded on each side to the adjacent tubes so that a solid panel wall is formed. The same type of finned tube arrangement can be used on the front furnace bottom wall as shown in FIG. 1. Black ash or char, after being cooled by the screen tubes 36 and 38, and also being cooled by the water cooled tubes 12 lining the furnace bottom, falls out of the furnace through discharge opening 46. Positioned directly beneath this discharge opening 46 is a trough 44 through which water continuously flows for transferring the char or black ash to a point remote from the furnace, where the char can be further processed in order to recover the inorganic chemicals and the carbon therefrom. This trough should be placed such that little or no air can enter into the furnace through the opening 46, which air could support combustion of the carbon within the black ash in the furnace bottom area.

The operation of the chemical recovery furnace will now be described. Black liquor is discharged into the furnace 10 through inlet openings 18. Air to support combustion of this black liquor enters by way of ports 20. The amount of air supplied through ports 20 should be controlled such that it is insufficient in amount to support combustion of all of the carbon contained in the black liquor. The black ash or char that is discharged from the furnace through opening 46 should contain 20–25% carbon in order to obtain the most economical operating arrangement. Thus, the amount of air entering through inlets 20 should be sufficient to support combustion of approximately three-fourths of the carbon contained in the black liquor supplied to the furnace. Auxiliary fuel and air entering through inlets 22 and 24 maintain ignition and stable burning of the black liquor within the furnace, and also helps evaporate water from the black liquor. Most of the water or moisture contained in the black liquor is evaporated therefrom while it is freely falling from the burners 18 down to and through the screen tubes 36 and 38. Much of the volatile matter contained in the black liquor is also driven off while it is falling.

Because of the lack of air, only a portion of the carbon is burned, preferably about three fourths or less. The temperature within the furnace at the burner level is approximately 2000° F. This burner level should be high enough above the furnace bottom so that the temperature of the black ash is reduced below its melting temperature (approximately 1400° F.) before coming in contact with the furnace bottom walls. If the particles are in molten form when they strike against these walls, they will tend to stick thereto causing an operating problem for their removal. They would also run more slowly down into the discharge opening 46 when in their molten form, and thus more complete combustion thereof may take place during this extended period if there is some air present in this area, which could be possible due to furnace air leakage. This would not be desirable since it would reduce the carbon content thereof. In a typical large chemical recovery furnace which may be approximately 20 feet square and over 80 feet in height, the burner level 18 should be approximately 20 feet above the screen tubes 36 and 38. This allows almost complete evaporation of the water from the black liquor as it is falling to the furnace bottom.

Although the preferred embodiment of the invention has been illustrated and described, other constructions might be used which still would fall within the confines of my invention. For example, it may be possible to get sufficient cooling in the furnace bottom from the water cooled walls thereof alone, without the use of screen tubes 36 and 38. If this were done, the furnace bottom tubes should not be finned, but the tubes should be constructed so as to lie directly adjacent one another thereby covering the entire furnace bottom wall area.

Having thus described my invention, what I claim as new and desire to secure by Letters Patent is:

1. In combination, a chemical recovery furnace for producing char, said furnace having enclosing side walls, a roof, and a bottom, first inlet means extending through a side wall by means of which black liquor, containing 25 percent to 50 percent water along with carbon and inorganic chemicals, is introduced into the furnace, second inlet means, at approximately the same height as the first inlet means, extending through a side wall by means of which air, insufficient to support complete combustion of the black liquor, is introduced into the furnace, all of the combustion air for the black liquor being supplied through said second inlet means, third inlet means extending through a side wall by means of which auxiliary fuel is introduced into the furnace to aid in maintaining ignition of the black liquor, the furnace bottom being constructed of water cooled wall portions which are at an angle to the horizontal and extend downwardly and inwardly to form a discharge opening, a screen made up of equally spaced water cooled tubes extending substantially horizontally across the cross sectional interior of the furnace adjacent the upper portion of the furnace bottom, through which the char passes in its fall to the discharge opening, conveying means positioned below the discharge opening, said conveying means being positioned such that it seals the discharge opening, thereby preventing air from entering the furnace through the discharge opening, the first inlet means being positioned at a height high enough above the furnace bottom such that the water is substantially evaporated from the black liquor and partial combustion thereof takes place while free falling to the furnace bottom, whereby the cooling effect of the water cooled wall portions of the furnace bottom and the screen, along with the lack of combustion air, reduces the temperature of the ash to below its fluid or melting temperature, and thus substantially solid particles of char made up of carbon and inorganic chemicals are discharged through the discharge opening and are continuously conveyed away by the conveying means.

2. The combination set forth in claim 1, said conveying means comprising a trough through which a liquid continuously flows.

References Cited by the Examiner

UNITED STATES PATENTS

| | | | |
|---|---|---|---|
| 1,809,501 | 6/1931 | Allen | 110—71 |
| 1,964,413 | 6/1934 | Hobbs | 122—235 |
| 2,213,052 | 8/1940 | Rosencrants et al. | 23—48 |
| 2,535,730 | 12/1950 | Gadret | 23—48 |
| 2,582,792 | 1/1952 | Paren | 23—48 |
| 2,960,390 | 11/1960 | Hockmuth | 23—277 |
| 3,071,448 | 1/1963 | Hockmuth | 23—277 |

MORRIS O. WOLK, *Primary Examiner.*

MAURICE A. BRINDISI, JAMES H. TAYMAN, JR., *Examiners.*

A. J. STEWART, J. J. MULLEN, *Assistant Examiners.*